United States Patent
De La Reza et al.

(10) Patent No.: US 8,267,702 B2
(45) Date of Patent: Sep. 18, 2012

(54) ELECTRICAL DISTRIBUTION CENTER ASSEMBLY HAVING A TERMINAL STABILIZER INTEGRALLY FORMED WITH A HOUSING

(75) Inventors: Alvaro Gino De La Reza, El Paso, TX (US); Erick A. Rodriguez, Chihuahua (MX); Michael F. Loew, El Paso, TX (US); Todd A. Meinberg, EL Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 13/115,342

(22) Filed: May 25, 2011

(65) Prior Publication Data

US 2011/0294311 A1    Dec. 1, 2011

Related U.S. Application Data

(60) Provisional application No. 61/348,428, filed on May 26, 2010.

(51) Int. Cl.
*H01R 12/00* (2006.01)
(52) U.S. Cl. ....................................... 439/76.1
(58) Field of Classification Search ................ 439/76.1, 439/76.2, 72, 364
See application file for complete search history.

(56) References Cited

U.S. PATENT DOCUMENTS

| | | | | |
|---|---|---|---|---|
| 5,067,905 | A * | 11/1991 | Matsumoto et al. | 439/76.2 |
| 5,715,135 | A | 2/1998 | Brussalis et al. | |
| 5,788,529 | A * | 8/1998 | Borzi et al. | 439/364 |
| 6,220,876 | B1 | 4/2001 | Avila et al. | |
| 6,422,881 | B1 | 7/2002 | Puhl et al. | |
| 6,468,091 | B2 * | 10/2002 | Roussel et al. | 439/72 |
| 6,739,889 | B1 | 5/2004 | Daggett et al. | |
| 6,761,568 | B2 | 7/2004 | Bakker et al. | |
| 6,896,531 | B2 | 5/2005 | Bakker et al. | |
| 7,351,073 | B2 * | 4/2008 | Kemp et al. | 439/79 |
| 7,635,212 | B2 | 12/2009 | Seidler | |
| 7,927,111 | B2 * | 4/2011 | Kita | 439/76.2 |
| 7,972,180 | B2 * | 7/2011 | Li et al. | 439/660 |
| 2010/0203746 | A1 * | 8/2010 | Kita | 439/76.1 |

* cited by examiner

*Primary Examiner* — Chandrika Prasad
(74) *Attorney, Agent, or Firm* — Thomas N. Twomey

(57) ABSTRACT

An electrical distribution center assembly includes a housing having a connector shroud. The shroud defines a shroud cavity adapted for receiving a mating electrical connector body. A blade stabilizer is formed integral with the shroud in a first position within the shroud cavity. The blade stabilizer has blade apertures formed therein. Bladed terminals extend from the housing into the blade apertures. In this position, the blade stabilizer protects the terminal blades from being bent away from a terminal axis. The blade stabilizer is movable to a second position to enable female terminals of the mating electrical connector to electrically connect to the blade terminals.

17 Claims, 5 Drawing Sheets

ELECTRICAL DISTRIBUTION CENTER ASSEMBLY HAVING A TERMINAL STABILIZER INTEGRALLY FORMED WITH A HOUSING

This application claims benefit of priority from U.S. Provisional Patent Application No. 61/348428, filed May 26, 2010.

TECHNICAL FIELD OF INVENTION

The invention relates generally to electrical distribution centers and more specifically to electrical distribution centers having at least one male terminal therewithin. Still more particularly, the present invention relates to electrical distribution centers of the aforesaid type incorporating a terminal stabilizer.

BACKGROUND OF INVENTION

Electrical distribution centers are widely used in vehicles. An electrical distribution center can package various fuses, relays and other electrical devices in a central location. Such electrical distribution centers include provisions for electrically connecting a power source and electrical devices housed in the electrical distribution center to electrical wiring harness connectors for supplying power and control signals to various electrical systems of the vehicle. Examples of electrical distribution centers may be found in U.S. Pat. No. 5,715,135 granted to Brussalis et al., U.S. Pat. No. 5,788,529 granted to Borzi et al., U.S. Pat. No. 6,220,876 granted to Avila et al., U.S. Pat. No. 6,739,889 granted to Daggett et al., and U.S. Pat. No. 7,635,212 granted to Seidler.

A known electrical distribution center that incorporates a connector shroud includes a non-movable floor that sits at the base of the male blade terminals to provide some level of blade dimensional stabilization prior to mating with a wiring harness connector. For additional blade stabilization and protection from damage prior to connector mating, a second piece, a blade stabilizer, is mounted to the shroud using flex locks to capture the terminals near the tips. As the connector is mated to the electrical distribution center in the vehicle, the second piece is pushed out of its flex locks and toward the connector floor near the base of the terminals. The design incorporating only a shroud with a floor at the base of the terminals does not provide optimal protection or terminal alignment, but is one piece and thus the less expensive alternative. The design incorporating the shroud having a non-movable floor and a second piece blade stabilizer requires two separate plastic pieces as well as the necessary labor and equipment to assemble them together, but provides much greater levels of pre-vehicle assembly protection and blade alignment to the product.

SUMMARY OF THE INVENTION

The present invention can enable a multifunctional connector shroud design employing a movable blade stabilizer that is molded into the overall shroud. Such a stabilizer can aid in providing the level of pre-vehicle assembly protection and alignment achieved with currently known connector shrouds incorporating loose piece blade stabilizers. The present invention can also aid in enabling lower cost blade stabilization and protection by eliminating the need for additional assembly of a loose piece blade stabilizer to an electrical distribution center assembly housing.

The invention can further enable a stabilizer wall that is molded into a shroud cavity at a male terminal tip position. And, by using either integral flexible springs or breakable tabs to attach the stabilizer wall to the shroud walls, the stabilizer is adapted and configured to enable a mating connector body to push the stabilizer wall to the floor of the connector shroud as the connector is inserted into the shroud during vehicle assembly. The male terminal base or a separate stand-off may be configured to function as a positive stop for the stabilizer wall.

The invention can further enable an electrical distribution center assembly including a housing assembly including first and second housing members which define an accommodation space therein; a connector shroud formed in the first housing member, the shroud having side walls defining a shroud cavity therein for receiving a mating plug connector, the shroud cavity communicating with the accommodation space; an electrical bus disposed in the accommodation space; a bladed terminal electrically contacting the electrical bus, the terminal including an elongated blade projecting along a terminal axis to a tip located in the shroud cavity; a terminal stabilizer formed integrally as a part of the first housing member and including a rigid stabilizer wall and an attachment portion, the stabilizer wall located within the shroud cavity and having a blade aperture formed therein, the attachment portion extending between the stabilizer wall and the side walls of the shroud for supporting the stabilizer wall in a terminal alignment position, wherein the tip of the terminal is received in the blade aperture, whereby the blade stabilizer protects the blade from being bent away from the terminal axis by a force applied to the blade in a direction orthogonal to the terminal axis.

In a preferred embodiment, the stabilizer wall is movable from the terminal alignment position to a seated position when at least a predetermined level of force is applied to the stabilizer wall in a direction parallel to the terminal axis. In the seated position stabilizer wall is closer to the electrical bus than when it is in the terminal alignment position. In the seated position, the blade of the bladed terminal is exposed for mating with a female terminal of the plug connector.

The invention can further aid in providing an electrical distribution center assembly including a housing assembly including a first housing member attached to a second housing member, the first housing member including a connector shroud and terminal stabilizer wall, the connector shroud defining a shroud cavity therein which has an opening for receiving a mating plug connector, the terminal stabilizer wall being integrally formed with the connector shroud in a terminal alignment position and defining a blade aperture extending therethrough; an electrical bus disposed in the housing assembly; and a male terminal having a base portion electrically contacting the electrical bus and a contact portion extending into the shroud cavity for mating with a female terminal of the plug connector, the contact portion projecting into the blade aperture, whereby the contact portion is stabilized within the shroud cavity.

The invention can further aid in providing an electrical distribution center assembly including a housing assembly including a first and a second housing member, the first housing member being of unitary construction and including an outer wall of the housing assembly, a connector shroud, and a terminal stabilizer, the shroud defining a shroud cavity therein for receiving a mating plug connector; a circuit board disposed in the body of the housing; and a blade stabilizer formed integrally with the shroud, the blade stabilizer including a blade stabilizer wall disposed within the shroud cavity and a blade stabilizer support for releasably supporting the blade stabilizer wall at a terminal alignment position, the blade stabilizer wall having a blade aperture formed therein at a location aligned with a terminal axis; a male terminal projecting along the terminal axis from the circuit board into the blade aperture, wherein when the blade stabilizer wall is in the terminal alignment position a void for protecting the male terminal exists and is defined axially between the blade stabilizer wall and the circuit board.

Further features, uses and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

This invention will be further described with reference to the accompanying drawings in which.

DETAILED DESCRIPTION OF INVENTION

Figure 1:
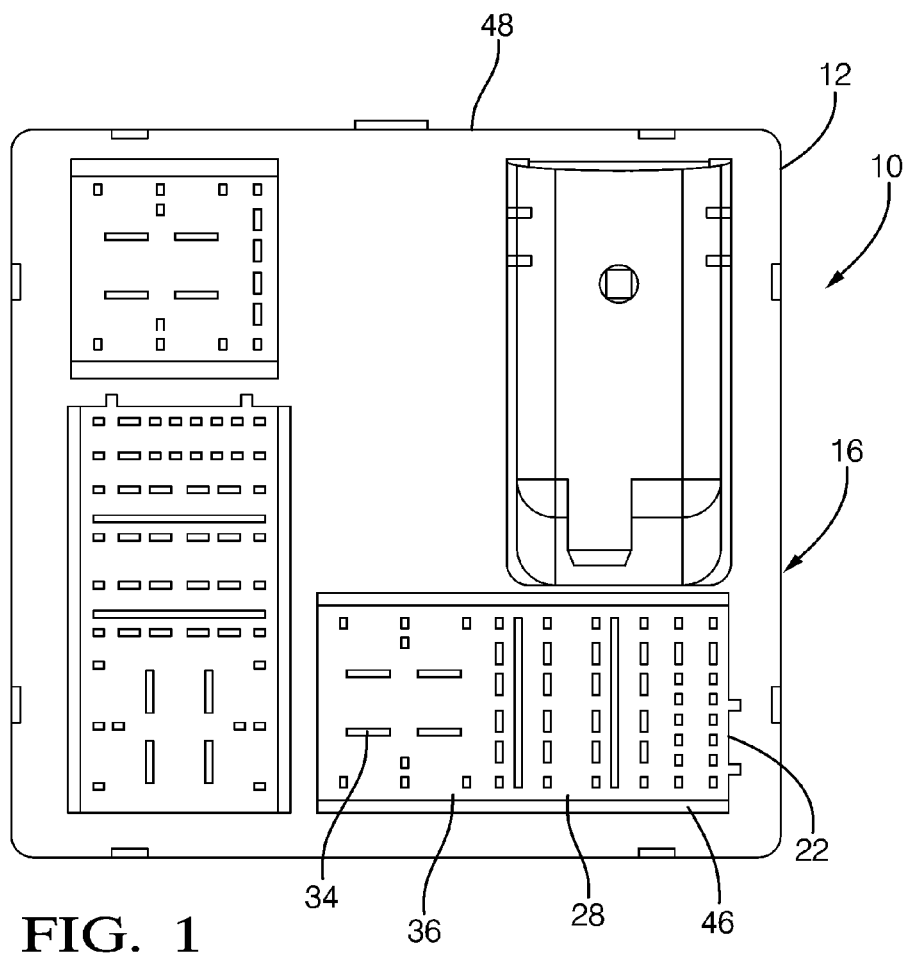
FIG. 1 is a bottom view of a lower housing of an electrical distribution center assembly in accordance with an embodiment of the present invention.

Referring to FIGS. 1-10 an electrical distribution center assembly 10 in accordance with a preferred embodiment of the present invention includes a housing 12 and an accommodation space 14 defined by housing 12. Housing 12 is formed from a semi-shell shaped lower housing 16 and an upper housing 18 attached to lower housing 16. A printed circuit board 20 is disposed in accommodation space 14. Alternatively, another type of electrical bus, such as a routed wire plate, may be used instead of or in addition to printed circuit board 20. Lower housing 16 includes a connector shroud 22. A plurality of male blade terminals 24 extend from printed circuit board 20 into a shroud cavity 26 defined by connector shroud 22. A male blade stabilizer 28 is integrally molded with connector shroud 22 in a terminal alignment position 30 within shroud cavity 26, whereby the tips 32 of male blade terminals 24 are received in respective blade apertures 34 formed in a stabilizer wall 36 of blade stabilizer 28. In this position blade stabilizer 28 protects the blades 38 of the male blade terminals 24 from being bent away from the terminal axis 40 by a force applied to the blade 38 in a direction orthogonal to the terminal axis 40. Connector shroud 22 is adapted and configured for mating with a plug electrical connector 42. During mating of plug electrical connector 42 with electrical distribution center assembly 10, at least a predetermined level of force applied to blade stabilizer 28 in a direction parallel to terminal axis 40 causes stabilizer wall 36 to move toward circuit board 20 to a seated position 44 with respect to male terminal 24 enabling plug electrical connector 42 to be received in shroud cavity 26 and fully mated with electrical distribution center assembly 10.

Figure 3:
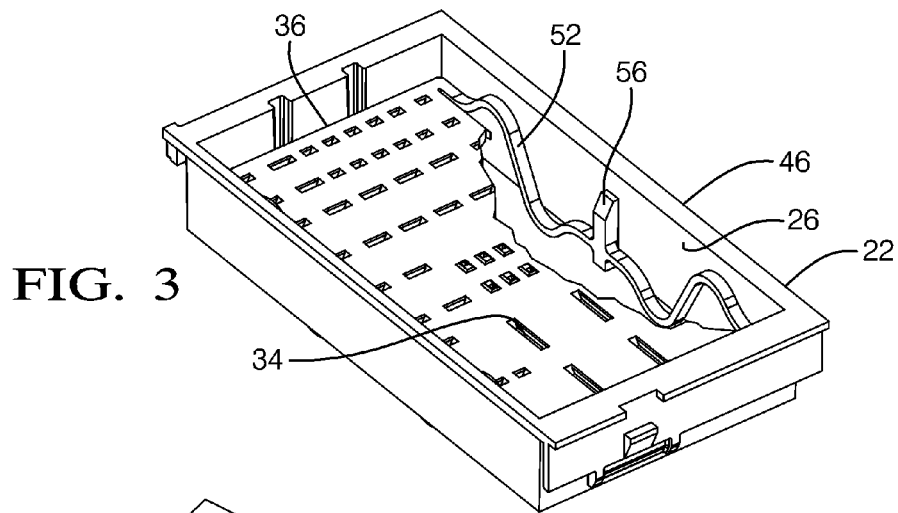
FIG. 3 is a perspective view of an aspect of an electrical distribution center assembly of the present invention.
Figure 4:
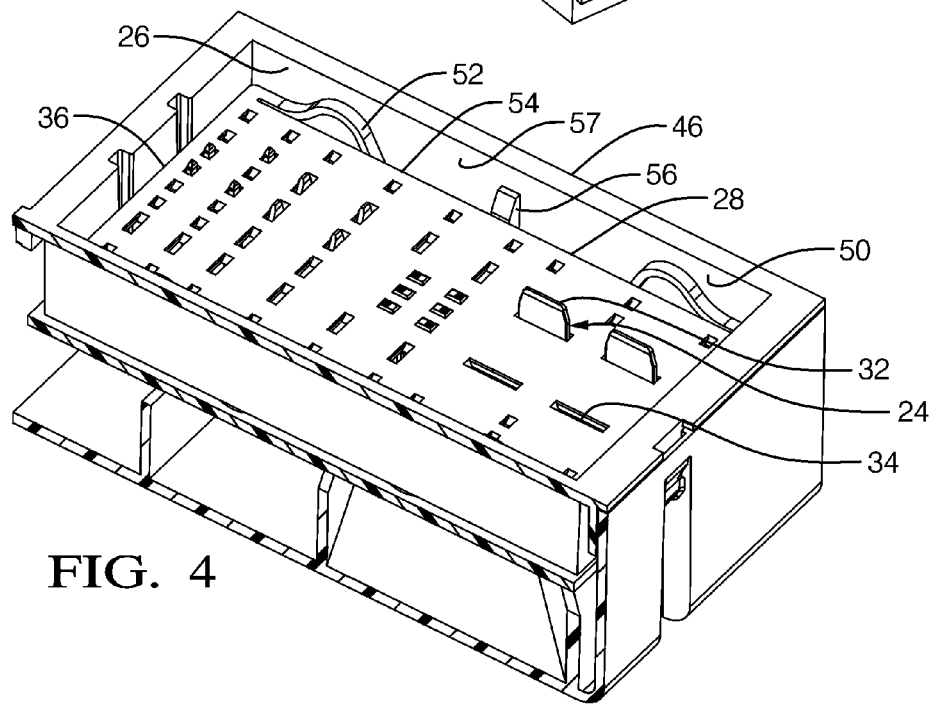
FIG. 4 is another perspective view of an aspect of an electrical distribution center assembly of the present invention.

Referring to FIGS. 1, 3, and 4, an electrical distribution center assembly 10 in accordance with a preferred embodiment of the present invention includes lower housing 16 and connector shroud 22 formed in lower housing 16. Connector shroud 22 is defined, at least in part, by shroud walls 46 extending outward from an outer facing wall 48 of lower housing 16. Shroud walls 46 define shroud cavity 26 having an opening 50. Blade stabilizer 28 is disposed in shroud cavity 26. Blade stabilizer 28 includes stabilizer wall 36 extending across shroud cavity 26 orthogonal to shroud walls 46. A plurality of blade apertures 34 extend through stabilizer wall 36 in parallel with terminal axis 40 (as shown on FIG. 6). Blade stabilizer 28 further includes a plurality of flexible springs 52 that attach stabilizer wall 36 to shroud walls 46. Preferably, flexible springs 52 extend from periphery 54 of stabilizer wall 36 to one or more spring mount 56 (one shown on FIGS. 3 and 4) formed in shroud walls 46. A gap 57 is formed between periphery 54 of stabilizer wall 36 and side walls 46 of the shroud 22. Alternatively, at least one flexible spring may extend between other portions of a lower housing and a stabilizer wall.

In a preferred embodiment, blade stabilizer wall 36, plurality of flexible springs 52, spring mount 56, and shroud walls 46 are all integrally formed together with lower housing 16. Preferably, blade stabilizer wall 36, plurality of flexible springs 52, spring mount 56, and shroud walls 46 are integrally formed together with lower housing 16 in a plastic molding process.

Referring to FIGS. 3 and 4, blade stabilizer 28 is shown as it is initially formed in terminal alignment position 30 with respect to male terminals 24. Flexible springs 52 extend from stabilizer wall 36 to spring mount 56 supporting stabilizer wall 36 in terminal alignment position 30 within shroud cavity 26 of connector shroud 22. As shown on FIG. 4, when blade stabilizer 28 is in terminal alignment position 30, tips 32 of respective male blade terminals 24 extend into respective one of blade apertures 34, whereby blade stabilizer 28 protects the blades 38 of terminals 24 from being bent away from terminal axis 40 by a force applied to the blades 38 in a direction orthogonal to terminal axis 40.

Figure 2:
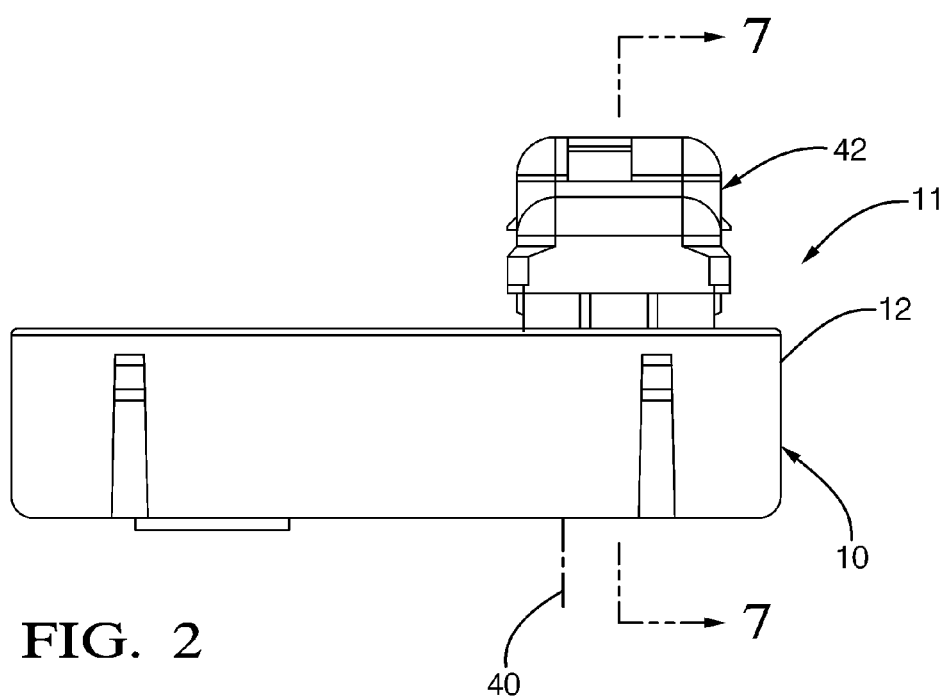
FIG. 2 is a side view of a housing of an electrical distribution center assembly and a mating connector assembly in accordance with an embodiment of the present invention.

FIG. 2 illustrates an electrical connection assembly 11 including a plug electrical connector 42 mated with electrical distribution center assembly 10.

Figure 5:
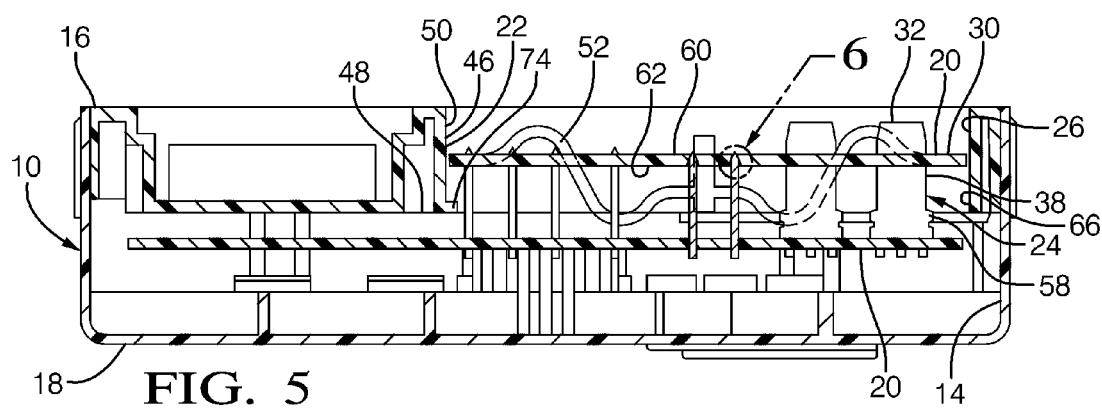
FIG. 5 is a side section view of an electrical distribution center assembly in accordance with an embodiment of the present invention.
Figure 6:
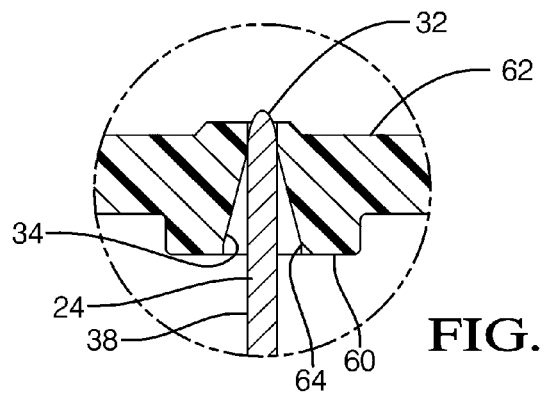
FIG. 6 depicts a detail of FIG. 5.

Referring to FIGS. 5 and 6, electrical distribution center assembly 10 includes lower housing 16 attached to upper housing 18. Lower housing 16 and upper housing 18 define an accommodation space 14. Printed circuit board 20 is disposed in accommodation space 14. Shroud walls 46 extend outward from face 48 of lower housing 16. Flexible springs 52 extend between shroud walls 46 and stabilizer wall 36 support blade stabilizer 28 in terminal alignment position 30. Male blade terminals 24 are electrically connected to conductive circuit traces (not shown) on printed circuit board 20. Male blade terminals 24 each have a base 58 connected to printed circuit board 20 and an elongated bladed portion 38 which extends from base 58 in parallel to terminal axis 40 to tip 32 disposed in shroud cavity 26. Each tip 32 is received in a respective one of the plurality of blade apertures 34. As shown on FIG. 6, blade apertures 34 extend between an inner face 60 of stabilizer wall 36 to an outer face 62 of stabilizer wall 36. Blade apertures 34 each have an enlarged opening 64 in inner face 60 of stabilizer wall 36 to facilitate assembly. As shown on FIG. 5, when blade stabilizer 28 is in terminal alignment position 30, a void 66 for protecting male terminals 24 exists and is defined axially between blade stabilizer wall 36 and circuit board 20.

Figure 7:
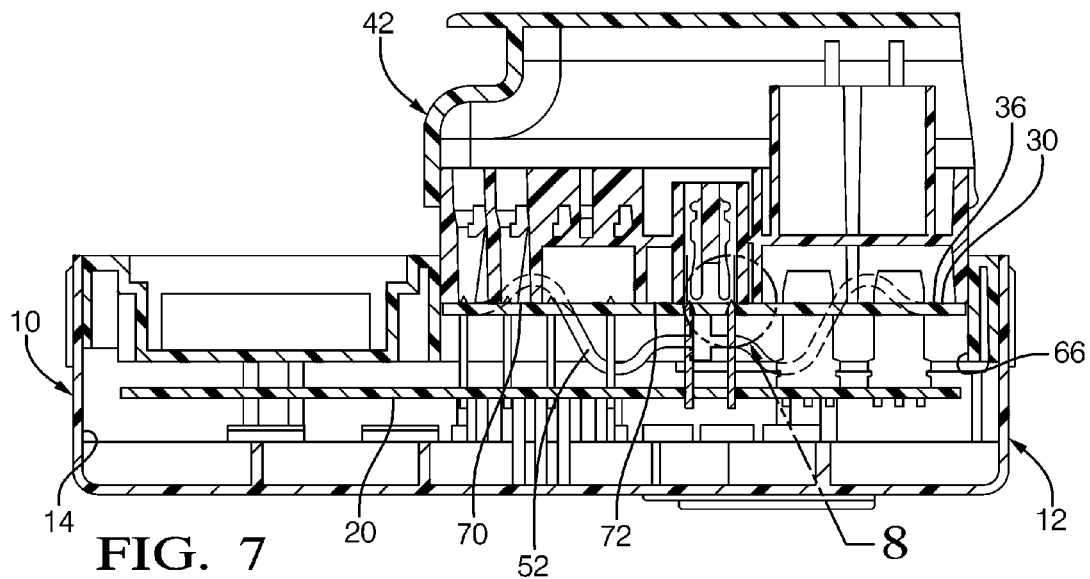
FIG. 7 is a side section view of an electrical distribution center assembly and an electrical connector assembly in a partially mated position in accordance with an embodiment of the present invention.
Figure 8:
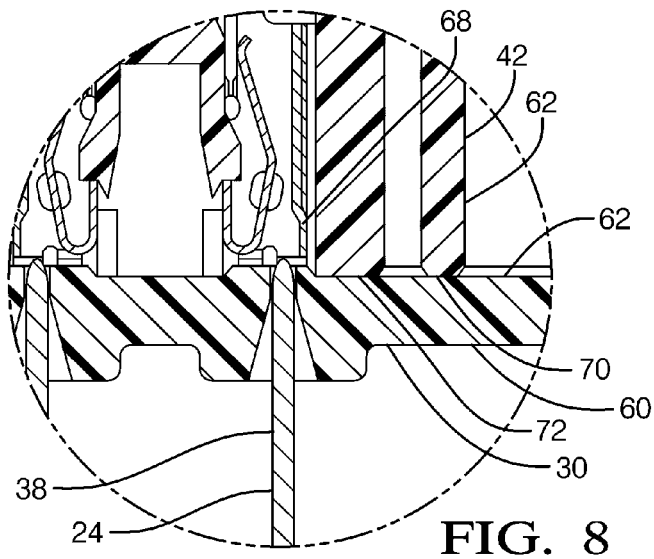
FIG. 8 depicts a detail of FIG. 7.

Referring to FIGS. 7 and 8, electrical distribution center assembly 10 is shown with blade stabilizer 28 in terminal alignment position 30. Plug connector 42 includes female terminals 68 constructed and arranged for mating with male blade terminals 24 when plug connector 42 is inserted into cavity 26 of connector shroud 22. In a pre-mating position as shown on FIGS. 7 and 8, a forward end 70 of plug connector 42 is received in opening 50 of shroud cavity 26. A forward face 72 of plug connector 42 contacts outer face 62 of stabilizer wall 36. During mating of plug connector 42 with electrical distribution center assembly 10, plug connector 42 is inserted into shroud cavity 26 using at least a predetermined level of force parallel with terminal axis 40 causing springs 52 to flex, thereby enabling stabilizer wall 36 to move from terminal alignment position 30 to seated position 44.

Figure 9:
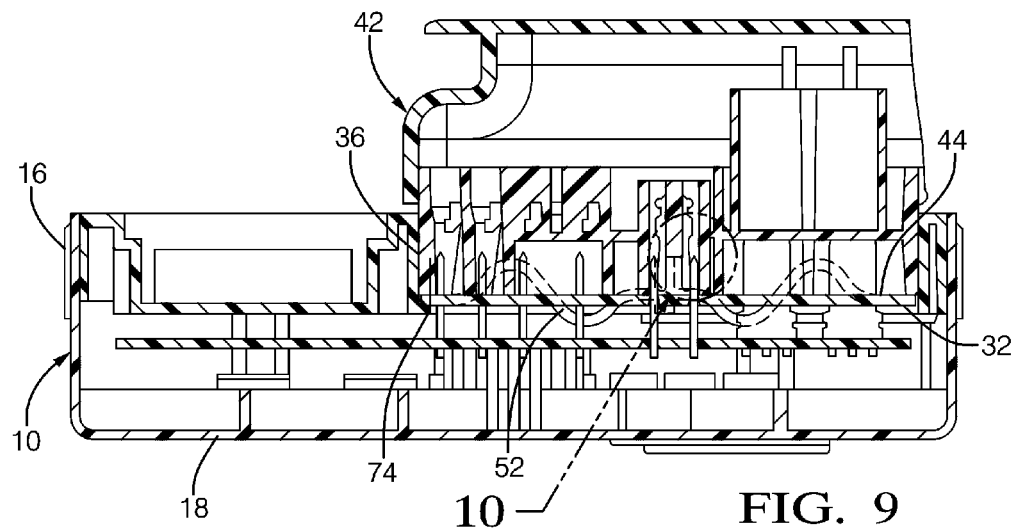
FIG. 9 is a side section view of an electrical distribution center assembly and a mating connector assembly in a fully mated position in accordance with an embodiment of the present invention.
Figure 10:
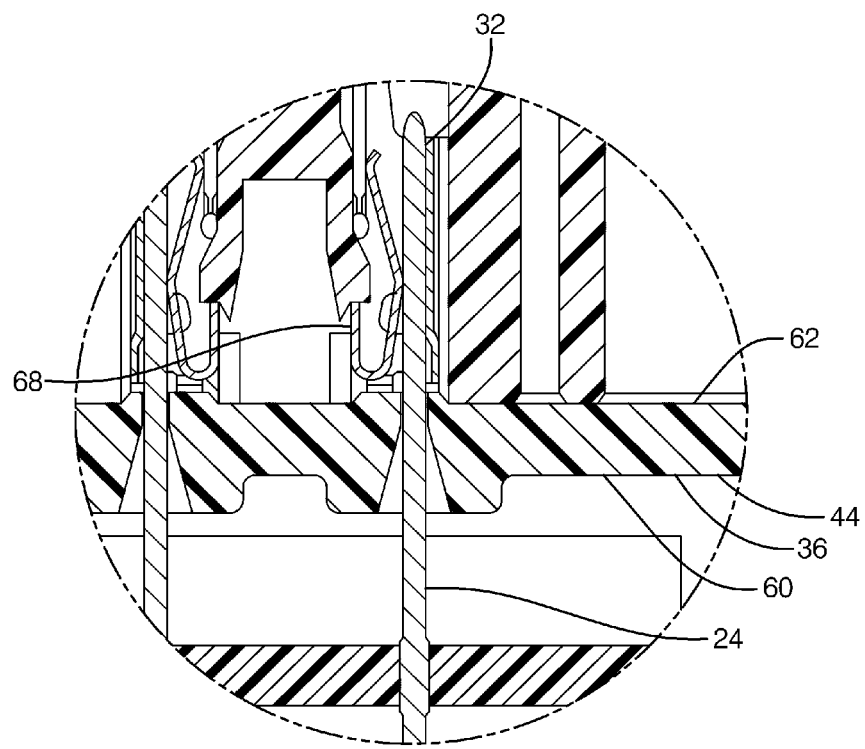
FIG. 10 depicts a detail of FIG. 9.

Referring to FIGS. 9 and 10, plug connector 42 is fully mated with electrical distribution center assembly 10 forming electrical connection assembly 11. In this configuration, plug connector 42 is fully received in shroud cavity 26 and female terminal 68 electrically contacts blade 38 of bladed terminal 28. Blade stabilizer 28 is in seated position 44, where it is positioned closer to circuit board 20 than when it is in the terminal alignment position 30. A positive stop 74 extending from side wall 46 of connector shroud 22 supports blade stabilizer 28 in seated position 44. Alternatively, terminal base 58 may be adapted and configured to be larger than blade aperture 34 so that terminal base 58 may serve as a positive stop for supporting blade stabilizer 28 in seated position 44. Blade 38 of terminal 24 is received in female terminal 68.

Figure 11:
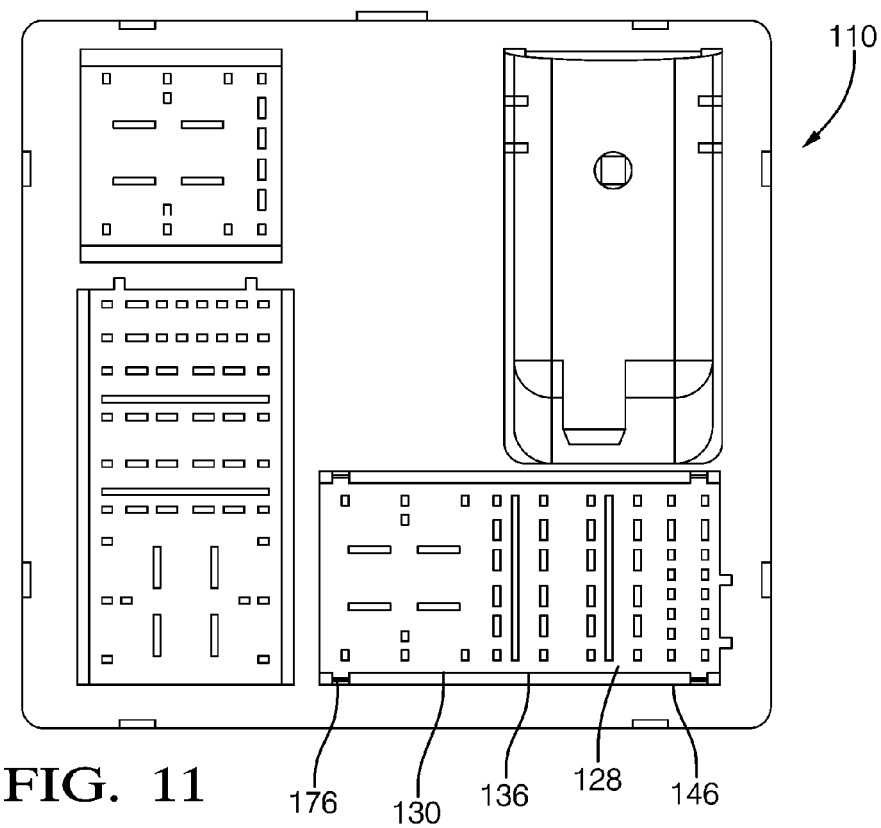
FIG. 11 is a bottom view of a lower housing of an electrical distribution center assembly in accordance with an alternate embodiment of the present invention.
Figure 12:
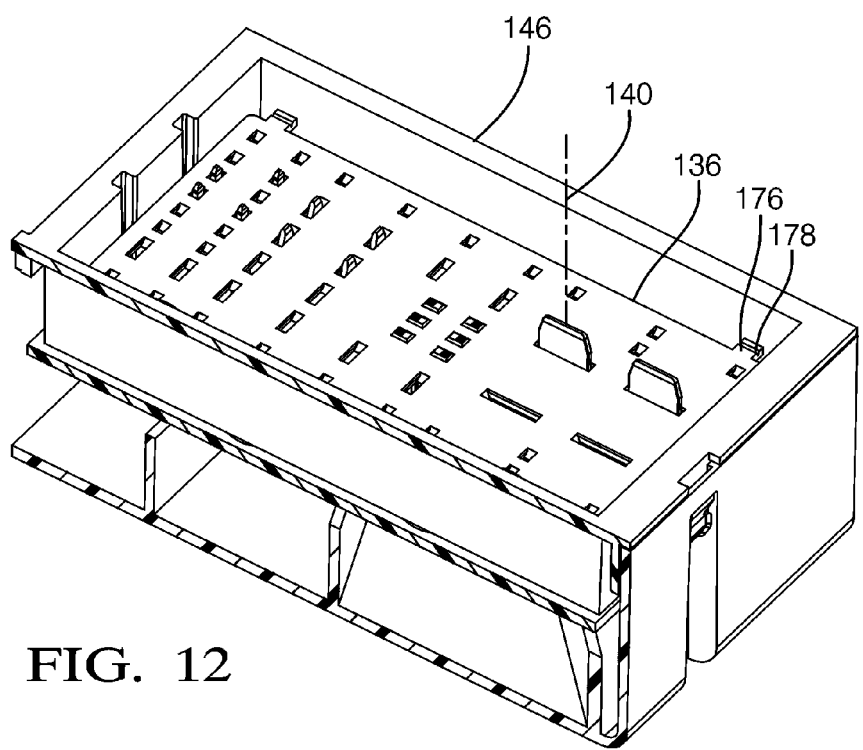
FIG. 12 is a perspective view of an aspect of an electrical distribution center assembly in accordance with an alternate embodiment of the present invention.

Referring to FIGS. 11 and 12, an alternate embodiment of an electrical distribution center assembly 110 in accordance with the present invention is similar to electrical distribution center assembly 10 shown in FIGS. 1-10 except that it includes a blade stabilizer 128 having a stabilizer wall 136 that is integrally attached to a shroud wall 146 by at least one breakable tab 176 instead of by at least one flexible spring. At least one breakable tab 176 is adapted and configured to break when at least a predetermined level of force is applied to stabilizer wall 136 in a direction parallel to a terminal axis 140, enabling stabilizer wall 136 to move from a terminal alignment position 130 to a seated position 144 which is closer to a circuit board 120 than the alignment position 130. At least one breakable tab 176 may alternatively include a narrowed portion or notch 178 for serving as break point. A lock (not shown) may be used for retaining stabilizer wall 136 in seated position 144 to prevent stabilizer wall from falling off if a mating connector is removed. In a preferred embodiment, blade stabilizer wall 136, breakable tab 176, and shroud walls 146 are integrally formed together with lower housing 116. Preferably, blade stabilizer wall 136, breakable tab 176, and shroud walls 146 are integrally formed together with lower housing 116 in a plastic molding process.

While this invention has been described in terms of the preferred embodiments thereof, it is not intended to be so limited, but rather only to the extent set forth in the claims that follow.

We claim:
1. An electrical distribution center assembly comprising:
a housing assembly comprising a first housing member attached to a second housing member, the housing assembly defining an accommodation space therein;
a connector shroud formed in the first housing member, the shroud having side walls defining a shroud cavity therein for receiving a mating plug connector, the shroud cavity communicating with the accommodation space;
an electrical bus disposed in the accommodation space;
a bladed terminal electrically contacting the electrical bus, the terminal comprising an elongated blade projecting along a terminal axis to a tip located in the shroud cavity; and
a terminal stabilizer formed integrally as a part of the first housing member and comprising a rigid stabilizer wall and an attachment portion, the stabilizer wall located within the shroud cavity and having a blade aperture formed therein, the attachment portion extending between the stabilizer wall and the side walls of the shroud for supporting the stabilizer wall in a terminal alignment position, wherein the tip of the terminal is received in the blade aperture, whereby the blade stabilizer protects the blade from being bent away from the terminal axis by a force applied to the blade in a direction orthogonal to the terminal axis.

2. The electrical distribution center assembly as recited in claim 1, wherein the stabilizer wall is movable from the terminal alignment position to a seated position when at least a predetermined level of force is applied to the stabilizer wall in a direction parallel to the terminal axis, wherein the seated position is closer to the electrical bus than the alignment position.

3. The electrical distribution center assembly as recited in claim 2, wherein the electrical bus is a circuit board.

4. The electrical distribution center assembly as recited in claim 3, further comprising a positive stop for supporting the stabilizer wall at the seated position.

5. The electrical distribution center assembly as recited in claim 4, wherein the attachment portion comprises at least one flexible spring, the at least one flexible spring configured and adapted to flex when the predetermined level of force is applied to the stabilizer wall in a direction parallel to the terminal axis for enabling the stabilizer wall to move from the terminal alignment position to the seated position.

6. The electrical distribution center assembly as recited in claim 4, wherein the attachment portion comprises at least one breakable tab configured and adapted to break when the predetermined level of force is applied to the stabilizer wall in a direction parallel to the terminal axis for enabling the stabilizer wall to move from the terminal alignment position to the seated position.

7. The electrical distribution center assembly as recited in claim 6, wherein the at least one breakable tab has a notch.

8. The electrical distribution center assembly as recited in claim 4, further comprising a plug connector and a female terminal disposed in the plug connector, wherein the plug connector being fully received in the shroud cavity, the female terminal being mated with the bladed terminal, and the stabilizer wall disposed in the seated position between a leading face of the plug connector and the circuit board.

9. An electrical distribution center assembly comprising:
a housing assembly comprising a first housing member attached to a second housing member, the first housing member comprising a connector shroud and terminal stabilizer wall, the connector shroud defines a shroud cavity therein which has an opening for receiving a mating plug connector, the terminal stabilizer wall is integrally formed with the connector shroud in a terminal alignment position, the terminal stabilizer wall defines a blade aperture extending therethrough;
an electrical bus disposed in the housing assembly; and
a male terminal having a base portion electrically contacting the electrical bus and a contact portion extending into the shroud cavity for mating with a female terminal of the plug connector, the contact portion projecting into the blade aperture, whereby the contact portion is stabilized within the shroud cavity.

10. The electrical distribution center assembly as recited in claim 9, wherein the stabilizer wall is movable a distance to a seated position, whereby the contact portion is exposed for mating to the female terminal of the plug connector.

11. The electrical distribution center assembly as recited in claim 10, wherein the first housing member comprises an outer wall of the housing assembly and the connector shroud comprises a shroud wall extending from the outer wall.

12. The electrical distribution center assembly as recited in claim 11, wherein the contact portion of the terminal extends in parallel with a terminal axis and the first housing member comprises at least one breakable tab extending to a peripheral edge of the stabilizer wall for releasably supporting the stabilizer wall in the terminal alignment position, wherein the blade stabilizer wall is movable from the terminal alignment position to the seated position when at least a predetermined level of force is applied to the blade stabilizer wall in a direction parallel to the terminal axis.

13. The electrical distribution center assembly as recited in claim 11, wherein the contact portion of the terminal extends in parallel with a terminal axis and the first housing member comprises at least one flexible spring extending to a peripheral edge of the stabilizer wall for supporting the stabilizer wall in the terminal alignment position, wherein the blade stabilizer wall is movable from the terminal alignment position to the seated position when at least a predetermined level of force is applied to the blade stabilizer wall in a direction parallel to the terminal axis.

14. The electrical distribution center assembly as recited in claim 10, further comprising a positive stop for supporting the stabilizer wall in the seated position.

15. An electrical distribution center assembly comprising:
a housing assembly comprising a first and a second housing member, the first housing member being of unitary construction and comprising an outer wall of the housing assembly, a connector shroud and a terminal stabilizer, the shroud defining a shroud cavity therein for receiving a mating plug connector;
a circuit board disposed in the housing assembly;
a blade stabilizer formed integrally with the shroud, the blade stabilizer comprising a blade stabilizer wall disposed within the shroud cavity and a blade stabilizer support for releasably supporting the blade stabilizer wall at a terminal alignment position, the blade stabilizer wall having a blade aperture formed therein at a location aligned with a terminal axis; and
a male terminal projecting along the terminal axis from the circuit board into the blade aperture, wherein when the blade stabilizer wall is in the terminal alignment position a void for protecting the male terminal exists and is defined axially between the blade stabilizer wall and the circuit board.

16. The electrical distribution center assembly as recited in claim 15, wherein the blade stabilizer wall has a seated position which is closer to the circuit board than the terminal alignment position, the blade stabilizer wall being movable from the terminal alignment position to the seated position when at least a predetermined level of force is applied to the blade stabilizer wall in a direction parallel to the terminal axis.

17. The electrical distribution center assembly as recited in claim 16, further comprising a positive stop for supporting the blade stabilizer wall in the seated position.

* * * * *